United States Patent [19]

Fremont

[11] Patent Number: 4,703,481

[45] Date of Patent: Oct. 27, 1987

[54] METHOD AND APPARATUS FOR FAULT RECOVERY WITHIN A COMPUTING SYSTEM

[75] Inventor: Michael J. Fremont, Palo Alto, Calif.

[73] Assignee: Hewlett-Packard Company, Palo Alto, Calif.

[21] Appl. No.: 766,212

[22] Filed: Aug. 16, 1985

[51] Int. Cl.$^4$ .............................................. G06F 11/14
[52] U.S. Cl. ........................................ 371/12; 364/200
[58] Field of Search ............................. 371/12, 16, 19; 364/200

[56] References Cited

U.S. PATENT DOCUMENTS

| | | | |
|---|---|---|---|
| 3,564,502 | 2/1971 | Boehner et al. | 364/200 |
| 3,564,506 | 2/1971 | Bee et al. | 371/12 X |
| 3,736,566 | 5/1973 | Anderson et al. | 364/200 |
| 4,030,074 | 6/1977 | Giorcelli | 364/200 |
| 4,130,240 | 12/1978 | Millham et al. | 371/12 |
| 4,493,035 | 1/1985 | MacGregor et al. | 364/200 |

FOREIGN PATENT DOCUMENTS

84/02410  6/1984  PCT Int'l Appl. .

OTHER PUBLICATIONS

IBM Tech. Disc. Bulletin, Lh. Haibt, et al., "Maintaining Order of Network Events", vol. 24, No. 7B, Dec. 1981, pp. 3722–3723.

IBM Tech. Disc. Bulletin, E. J. Cerul, et al., "Synchronized Error Injection", vol. 24, No. 5, Oct. 1981, p. 2339.

Primary Examiner—Charles E. Atkinson
Attorney, Agent, or Firm—Douglas L. Weller

[57] ABSTRACT

A method and apparatus are presented which enable recovery from a fault occurrence within a computing system which occurs during an original execution of machine instructions. The computing system is reset to a previously recorded system state, and a re-execution of machine instructions is initiated. To repeat an asynchronous event at a point in the re-execution of machine instructions identical to a point at which the repeating event was handled in the original execution of machine instructions, machine instructions executed and re-executed are counted. During the re-execution of machine instructions, the computing system performs operations upon identical inputs, at identical points, that the computing system did during the original execution of machine instructions. The computing system is thereby restored to a final system state identical to a specified system state existing before fault occurrence.

35 Claims, 7 Drawing Figures

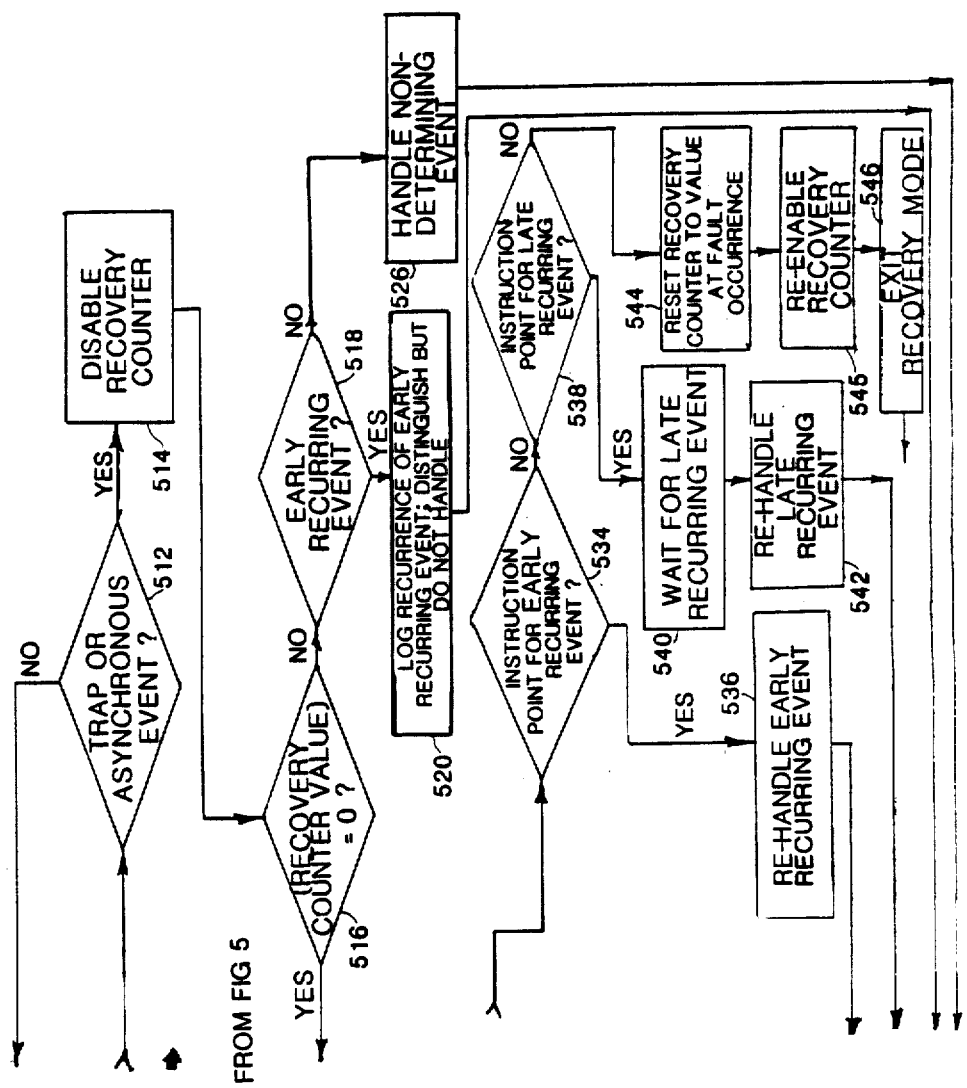

METHOD AND APPARATUS FOR FAULT RECOVERY WITHIN A COMPUTING SYSTEM

BACKGROUND

The present invention relates to fault tolerant computing systems. In particular, the present invention deals with recovering from a fault occurrence detected within a computing system. A fault occurrence is an occurrence during an execution of machine instructions which renders data or a subsequent execution of machine instructions invalid. Rather than halt entirely and reboot the computing system, it is desirable to recover and continue execution of machine instructions, with a minimum amount of disruption, assured that data and subsequent execution of machine instructions will be valid.

The computing system is characterized by a set of attributes called a system state. A system state includes process data, consisting of process control blocks and local data accessible to processes, and file data, consisting of permanent data, such as database files.

Prior recovery schemes only partially recovered from a fault occurrence. Any modifications of file data begun before fault occurrence were either completely finished or completely undone. Prior recovery schemes periodically recorded, at checkpoints, enough data to completely restore a checkpoint system state, which is a system state existing at a checkpoint.

When a fault was detected, a previously performed file modification was undone by running backwards through previously logged information describing the file modification. The computing system was reset to a checkpoint system state most recently recorded, defined as a last checkpoint system state.

Prior recovery schemes typically did not restore file data to an identical condition existing immediately before fault occurrence. Processes which did not finish modifying file data before fault occurrence were aborted, not restarted. The system state reached by completing fault recovery, defined as a final system state, was typically not a pre-fault system state. The pre-fault system state is the system state existing immediately before fault occurrence. The final system state was often merely the last checkpoint system state.

Prior recovery schemes used modular redundancy to provide fault tolerance. Two or more processors would execute in parallel, executing identical code. At periodic checkpoints, parallel results would be compared. Should the results be found to be different, an arbitration scheme would choose between the parallel results. Modular redundancy was cost prohibitive; duplicating hardware was too expensive.

In the prior art, a scheme enabled a final system state identical to a pre-fault system state to be reached. Checkpoints were inserted before every point at which a nonrepeatable I/O operation was to be performed. At each checkpoint, a user had to insert code which would record enough information to restore a checkpoint system state.

The scheme suffered several disadvantages. The scheme was not transparent to a user, but instead made the user partially responsible for insuring that error recovery would be correct. The scheme required a user to select what information had to be recorded at each checkpoint, and was therefore more prone to human error than a scheme that was transparent. Selecting insufficient information would jeopardize correct recovery, yet selecting too much information would degrade system performance.

Another disadvantage was that a checkpoint interval, which is an interval between two successive checkpoints, was program driven instead of being program independent. Excessive overhead was involved in recording checkpoint information before each non-repeatable I/O operation. The excessive overhead seriously degraded system performance. Checkpoint intervals could not be made longer than intervals between non-repeatable I/O operations. Overhead could not be spread over a longer checkpoint interval, thereby improving system performance. Since mean recovery time is related to the checkpoint interval, no trade-off could be made between system performance and mean recovery time.

SUMMARY OF THE INVENTION

In accordance with the preferred embodiment of the present invention, a method and apparatus are presented which enable recovery from a fault occurrence within a computing system which occurs during an original execution of machine instructions. The computing system is reset to a last checkpoint system state, and a re-execution of machine instructions is initiated. The present invention restores the computing system to a final system state identical to a specified pre-fault system state.

When the re-execution of machine instructions is initiated, the computing system performs operations upon identical inputs, at identical instruction points, that the computing system did during the original execution of machine instructions. An instruction point is a point at which an execution or a re-execution of a machine instruction has completed; an instruction point is determined by a count of machine instructions executed, and not by a passage of time.

The present invention repeats, during the re-execution of machine instructions, each determining event which was handled during the original execution of machine instructions. A determining event is an asynchronous interruption whose handling affects a determination of a final system state. For instance, a determining event is typically an input event, a message receipt, a reading of a real-time clock, a process creation, or a process swapping. Each determining event is repeated at an instruction point in the re-execution of machine instructions identical to an instruction point in the original execution of machine instructions at which the determining event originally was handled. A determining event is repeated either by rehandling a recurrence of the determining event, or by simulating a recurrence and handling of the determining event.

The present invention does not necessarily repeat nondetermining events during the re-execution of machine instructions. A non-determining event is an asynchronous interruption whose handling is transparent to a determination of a final system state. For instance, a nondetermining event is a cache fault or a page fault. Although non-determining events may recur during the re-execution of machine instructions, non-determining events need not necessarily be repeated to restore the computing system to the pre-fault system state.

The present invention counts certain machine instructions executed and re-executed, to repeat a 1determining event at an instruction point identical to an instruction point in the original execution of machine instructions at which the determining event was handled. Machine instructions executed during handling or repeating of determining events, and machine instructions executed during handling of non-determining events, are typically not counted.

The present invention is superior to a computing system which attempts fault recovery by only keeping track of a time at which a determining event recurs. An original execution of machine instructions may take more or less time to complete than a re-execution of identical machine instructions. For instance, an I/O operation whose execution time is dependent upon an original head position of a disk may result in a different access time for a re-execution.

If a computing system only keeps track of a time at which a determining event recurs, a determining event might not be repeated at an instruction point in re-execution of machine instructions identical to an instruction point at which the determining event was originally handled. A final system state reached by re-execution of machine instructions would differ from a pre-fault system state reached by original execution of machine instructions. The present invention insures that a pre-fault system state is reached; it always repeats a determining event at an instruction point in re-execution of machine instructions identical to an instruction point in execution of machine instructions at which the determining event was originally handled.

The present invention allows checkpoint intervals which are independent of user application programs. Checkpoint intervals are programmable, thereby allowing a trade-off to be made between system performance and mean recovery time. The present invention is transparent to user applications, thereby reducing risk of inadvertent programmer error.

The present invention is not dependent upon immediate fault detection. So long as a fault is detected before it has propagated side effects which require human intervention, fault recovery can still be achieved. Less hardware is required, since hardware that immediately detects a fault can be replaced with hardware and software that quickly detect a fault.

DESCRIPTION OF THE PREFERRED EMBODIMENT

Figure 1:
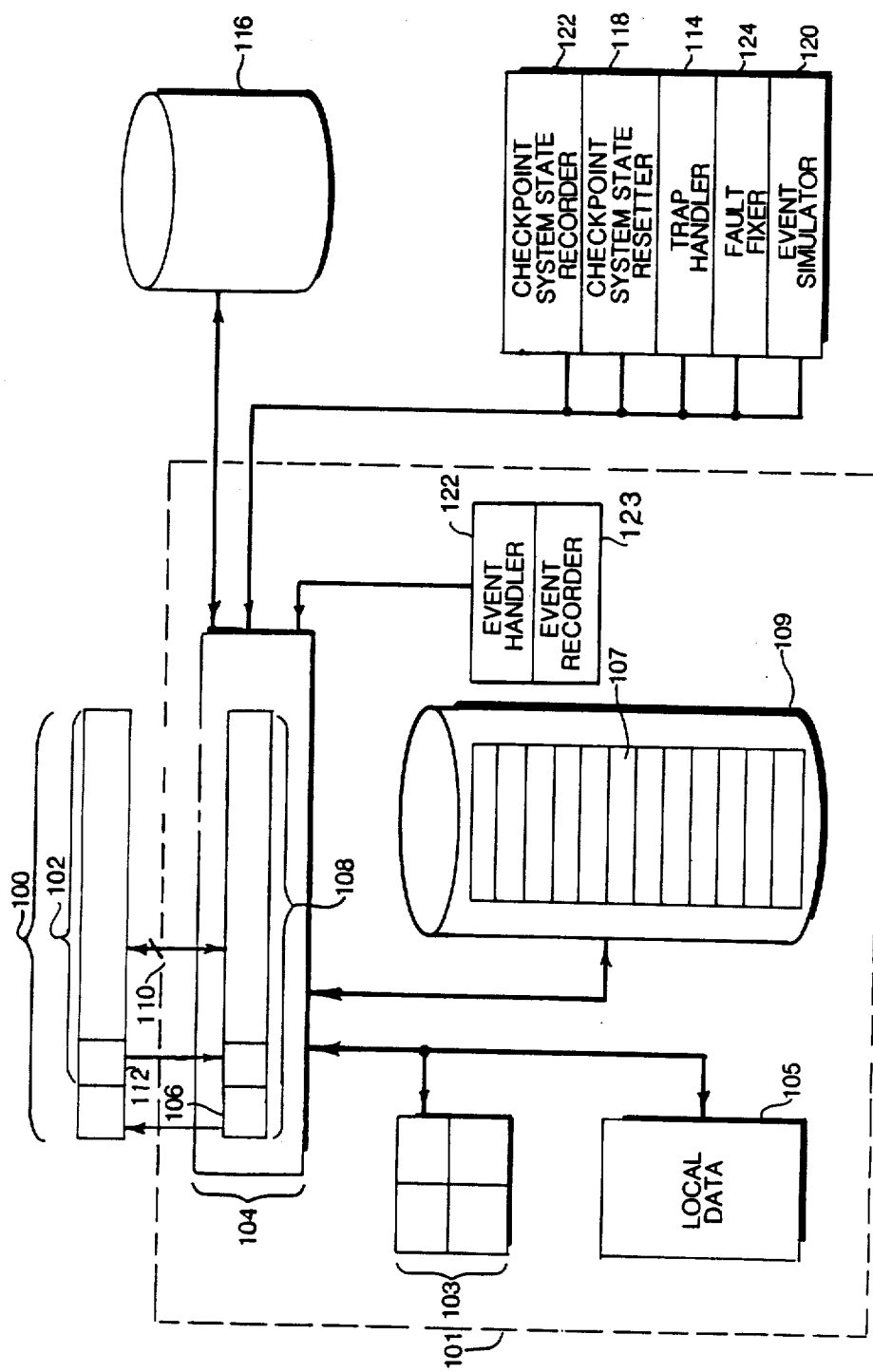
FIG. 1 is a block diagram of a recovery counter apparatus and connections within a computing system.

The preferred embodiment uses a recovery counter to count machine instructions originally executed, and subsequently re-executed. FIG. 1 shows a recovery counter 100, which is a control register. A computing system 101 includes process control blocks 103 and local data 105, as well as file data 107 on a disk 109. A recovery counter value 102, which is stored within recovery counter 100, is decremented by one with an execution of each single machine instruction by a processor 104. An enabling/disabling bit 106 in a processor status word 108 can be used to enable and disable recovery counter 100 from counting. Recovery counter 100 can be read from and written into via a bus 110.

When recovery counter value 102 counts down through zero, a high bit 112 generates a trap. A trap is an internal interruption that turns over program control to a trap handler 114, which is software that handles the trap. An event handler 122 and an event logger 123 reside in software. A checkpoint system state recorder 126, a fault fixer 124, a checkpoint system state resetter 118, and an event simulator 120 also reside in software. Information can be written to a disk 116.

Figure 2:
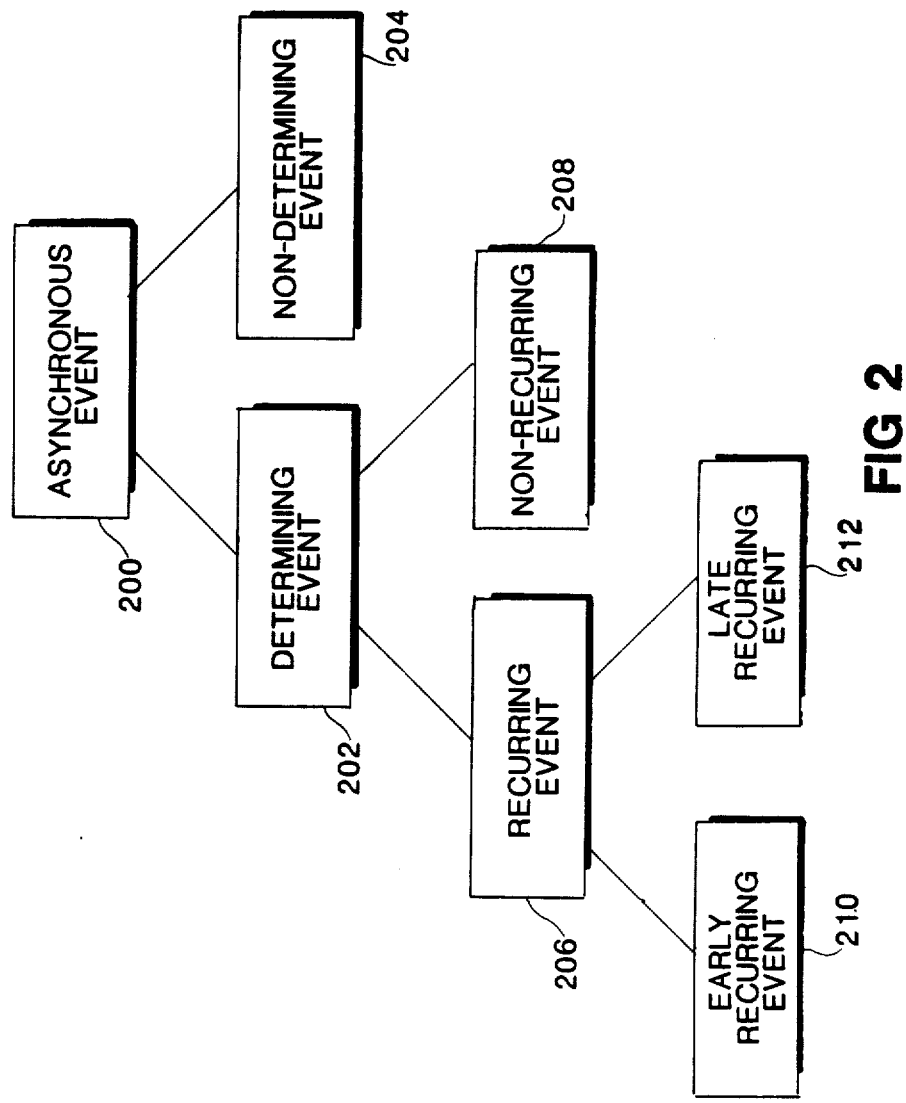
FIG. 2 is a block diagram of a definitional hierarchy for classifying asynchronous events.

FIG. 2 shows a definitional hierarchy for classifying asynchronous events. An asynchronous event 200 is defined as either a determining event 202, or a non-determining event 204. As discussed earlier, a determining event is an asynchronous interruption whose handling affects a determination of a final system state, and a non-determining event is an asynchronous interruption whose handling is transparent to a determination of a final system state.

Determining event 202 is defined as either a recurring event 206 or a non-recurring event 208. A recurring event is a determining event which recurs as a result of a re-execution of machine instructions. For instance, an input event due to a disk read, which occurs during an original execution of machine instructions, recurs as a result of a re-execution of the machine instructions. A non-recurring event is a determining event which does not recur as a result of a re-execution of machine instructions. For instance, an input event due to a keyboard input by a human, which occurs during an original execution of machine instructions, does not recur as a result of a re-execution of the machine instructions.

In a re-execution of machine instructions, recurring event 206 is classified as either an early recurring event 210 or a late recurring event 212. An early recurring event recurs in a re-execution of machine instructions at an instruction point before an instruction point IP', where IP' is identical to an instruction point IP, and the early recurring event originally was handled in an execution of machine instructions at IP. A late recurring event recurs in a re-execution of machine instructions at an instruction point at or after an instruction point IP', where IP' is identical to an instruction point IP, and the late recurring event originally was handled in an execution of machine instructions at IP.

Figure 3:
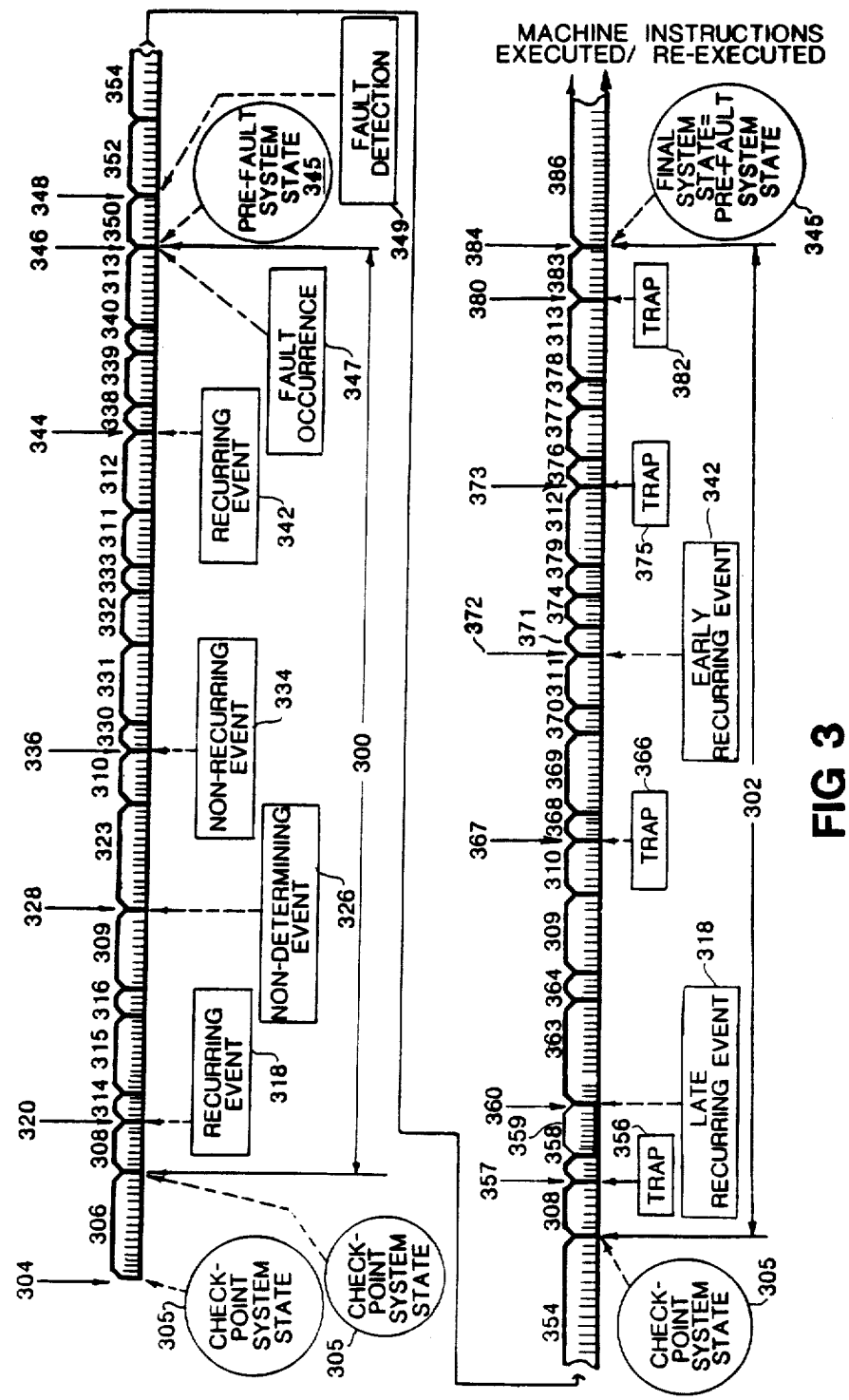
FIG. 3 depicts a typical execution sequence of machine instructions, and a corresponding re-execution sequence of machine instructions.

FIG. 3 depicts a preferred embodiment in which an instruction point at which a fault occurs can be located. A series of machine instructions executed for a typical execution sequence 300 and a typical re-execution sequence 302 are depicted. An execution sequence is a series of machine instructions, executed in an order before fault occurrence. A re-execution sequence is a series of machine instructions, executed after fault detection, corresponding to a specified execution sequence. A re-execution sequence contains executed machine instructions which are substantially identical to originally executed machine instructions. Machine instructions are re-executed in an order identical to a specified order in which the machine instructions were originally executed.

An instruction point 304 is a checkpoint. At instruction point 304, a checkpoint system state 305 exists. A series of machine instructions 306 is executed by running checkpoint system state recorder 126. Checkpoint system state recorder 126 records enough information on disk 116 to be able to completely restore computing system 101 to checkpoint system state 305. After execution of series of machine instructions 306, computing system 101 is left in checkpoint system state 305.

Execution sequence 300 includes series of machine instructions 308, 309, 310, 311, 312, and 313; previously executed series of machine instructions 308, 309, 310, 311, 312, and 313 are re-executed in re-execution sequence 302.

Series of machine instructions 314, 315, and 316 are executed to handle a recurring event 318 which occurs at an instruction point 320. Event handler 122 is run to execute series of machine instructions 314 and 316, and event logger 123 is run to execute series of machine instructions 315. Event logger 123 is run to log determining event information. Determining event information is information necessary to distinguish a determining event's occurrence from another determining event's occurrence. The determining event information includes a count of machine instructions executed since a last checkpoint, not including machine instructions executed for handling of non-determining events.

A series of machine instructions 323 is executed to handle a non-determining event 326 which occurs at an instruction point 328. Event handler 122 is run to execute series of machine instructions 323.

Series of machine instructions 330, 331, 332, and 333 are executed to handle a non-recurring event 334 which occurs at an instruction point 336. Event handler 122 is run to execute series of machine instructions 330 and 333, and event logger 123 is run to execute series of machine instructions 331 and 332. Series of machine instructions 331 is executed to log determining event information, and series of machine instructions 332 is executed to log a non-recurring input. A non-recurring input is an input received as part of a non-recurring event's handling.

Series of machine instructions 338, 339, and 340 are executed to handle a recurring event 342 which occurs at an instruction point 344. Event handler 122 is run to execute series of machine instructions 338 and 340, and event logger 123 is run to execute series of machine instructions 339. Event logger 123 is run to log determining event information.

A pre-fault system state 345 exists at an instruction point 346. A fault occurrence 347 takes place at instruction point 346. Fault detection takes place at an instruction point 348. A series of machine instructions 350 is executed between instruction point 346 and instruction point 348. Fault occurrence 347 renders an execution of series of machine instructions 350 invalid.

Following fault detection 349, computing system 101 conceptually enters a recovery mode, and a series of machine instructions 352 is executed by running fault fixer 124. Execution of series of machine instructions 352 is an attempt to prevent an imminent fault occurrence identical or similar to fault occurrence 347. For instance, if fault occurrence 347 was not transient, but was due to a partial failure of physical memory, control data for virtual memory management would be updated to reflect a new physical configuration of computing system 101.

Fault fixer 124 also takes certain steps to insure that certain output is not undesirably repeated during re-execution sequence 302. For instance, fault fixer 124 temporarily disables certain output ports, such as output ports for printers and terminals. Fault fixer 124 takes steps to insure that re-execution sequence 302 will not be affected by a new physical configuration of computing system 101 For instance, a new, longer physical path to a device might result in a longer software path to the device, requiring two additional machine instructions to be executed for each access to the device. Fault fixer 124 would use previously logged data to determine if and when the device was accessed during execution sequence 300. Fault fixer 124 would modify previously logged counts of machine instructions executed to reflect the two additional machine instructions which would have to be executed in re-execution sequence 302 for each access of the device.

If fault fixer 124 is unable to repair damage within computing system 101, fault fixer 124 requests human intervention. Even if human intervention requires computing system 101 to be brought down, enough information has already been logged to disk 116 to enable complete fault recovery once the damage is repaired. If computing system 101 cannot be repaired, enough information has already been logged to disk 116 to enable complete fault recovery on a parallel computing system.

Checkpoint system state resetter 118 is run to execute a series of machine instructions 354. During execution sequence 300, file data is modified in a manner so that any changes made to file data can later be undone. Using a previously recorded log, checkpoint system state resetter 118 restores computing system 101 to checkpoint system state 305 by resetting file data 107, process control blocks 103, and local data 105.

A trap 356 is generated by high bit 112 at an instruction point 357. Instruction point 357 in re-execution sequence 302 is identical to instruction point 320 in execution sequence 300. Recurring event 318 should be re-handled at instruction point 357. Recurring event 318 is a late recurring event, and does not recur until an instruction point 360. Processor 104 waits for recurring event 318. Trap handler 114 is run to execute a series of machine instructions 358 which perform initial trap handling. Processor 101 loops in an idle cycle, executing a series of machine instructions 359, waiting for recurring event 318 to recur.

When recurring event 318 recurs at instruction point 360, a series of machine instructions 363 and 364 are executed to re-handle recurring event 318. Event handler 122 is run to execute series of machine instructions 363, and trap handler 114 is run to execute series of machine instructions 364.

A trap is not generated in re-execution sequence 302 for non-determining event 326, nor does non-determining event 326 recur in re-execution sequence 302.

A trap 366 is generated by high bit 112 at an instruction point 367. Instruction point 367 in re-execution sequence 302 is identical to instruction point 336 in execution sequence 300. Non-recurring event 334 does not recur due to a re-execution of machine instructions in re-execution sequence 302. Non-recurring event 334 is simulated. A series of machine instructions 368, 369, and 370 are executed to simulate non-recurring event 334. Trap handler 114 is run to execute series of machine instructions 368 and 370, and event simulator 120 is run to execute series of machine instructions 369. Event simulator 120 simulates recurrence and handling of non-recurring event 334, using the non-recurring input which was previously logged.

An instruction point 373 in re-execution sequence 302 is identical to instruction point 344 in execution sequence 300. Recurring event 342 should be re-handled at instruction point 373. Recurring event 342 is an early recurring event; recurring event 342 recurs at an instruction point 372, which comes before instruction point 373. A series of machine instructions 371, 374, and 379 are executed upon recurrence of recurring event 342. Event handler 122 is run to execute series of machine instructions 371 and 379, and event logger 123 is run to execute series of machine instructions 374. Event handler 122 does not immediately re-handle recurring event 342 at instruction point 372; event handler 122 calls event logger 123 to log and distinguish recurrence of recurring event 342, but recurring event 342 is not re-handled until instruction point 373 is reached. Should recurring event 342 require immediate attention at instruction point 372, event handler 122 deals with recurring event 342 at instruction point 372. Nothing is "reported" until instruction point 373 is reached; from a viewpoint of a user program, recurring event 342 is not re-handled until instruction point 373.

Before instruction point 373 is reached, series of machine instructions 312 is re-executed. A trap 375 is generated by high bit 112 at instruction point 373. Recurring event 342 is re-handled, beginning at instruction point 373. A series of machine instructions 376, 377, and 378 are executed to re-handle recurring event 342. Trap handler 114 is run to execute series of machine instructions 376 and 378, and event handler 122 is run to execute series of machine instructions 377.

A trap 382 is generated by high bit 112 at an instruction point 380. Instruction point 380 is identical to instruction point 346; fault occurrence 347 took place at instruction point 346. Trap handler 114 is run to execute a series of machine instructions 383. Trap handler 114 resets recovery counter value 102 to a value that existed at instruction point 346. Trap handler 114 causes computing system 101 to exit recovery mode.

A final system state is reached, at an instruction point 384, that is identical to pre-fault system state 345. After instruction point 384, a series of machine instructions 386 is executed which continues normal execution.

Figure 4:
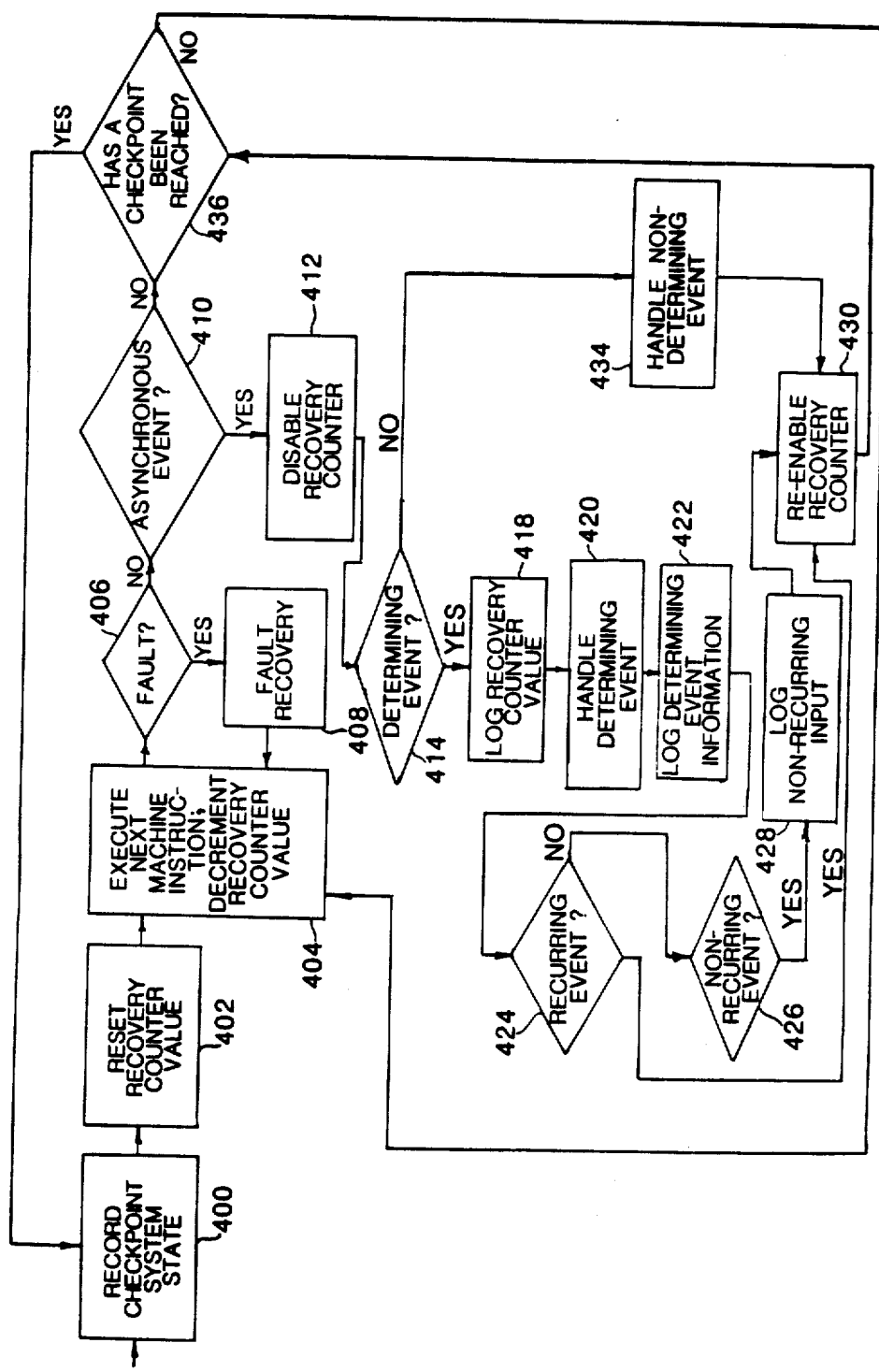
FIG. 4 is a flow-chart depicting steps taken during execution of machine instructions to prepare for system recovery due to fault occurrence.

FIG. 4 illustrates steps performed by the preferred embodiment in preparing for recovery from fault occurrence. Enough data to completely restore a checkpoint system state is recorded periodically to disk 116 by running checkpoint system state recorder 126 in a step 400. Recovery counter value 102 is reset via bus 110 to a specified initial value in a step 402. A machine instruction is executed by processor 104, and recovery counter value 102 is decremented for each machine instruction executed, in a step 404.

If a fault occurrence is detected in a step 406, fault recovery is performed in a step 408. Fault recovery is discussed below and is shown in greater detail in FIG. 5. Step 404 is returned to; execution of machine instructions continues.

If an asynchronous event does not occur in a step 410, a step 436 is performed. If it is ascertained in step 436 that a checkpoint is to be taken, processor 104 returns to step 400; enough data to completely restore a checkpoint system state is recorded to disk 116. If it is ascertained in step 436 that a checkpoint has not been reached, processor 104 returns to step 404. Another machine instruction is executed, and recovery counter value 102 is decremented.

If an asynchronous event does occur in step 410, recovery counter 100 is temporarily disabled. Disabling of recovery counter 100 is accomplished automatically in hardware by resetting enabling/disabling bit 106 in a step 412.

If it is ascertained in a step 414 that a determining event has occurred, recovery counter value 102 is read via bus 110 and logged in a step 418. Event handler 122 is run to handle the determining event in a step 420. Event logger 123 is run to log determining event information to disk 116 in a step 422.

If it is ascertained in a step 424 that a recurring event has occurred, recovery counter 100 is re-enabled via enabling/disabling bit 106 in a step 430. Re-enabling of recovery counter 100 is accomplished automatically in hardware when a return from interrupt instruction is executed which sets enabling/disabling bit 106 in a step 430. Whether a checkpoint has been reached is checked for in step 436.

If it is ascertained in a step 426 that a non-recurring event has occurred, then a non-recurring input, which is an input received during a non-recurring event's handling, is logged to disk 116 in a step 428. Recovery counter 100 is re-enabled via enabling/disabling bit 106 in step 430. Whether a checkpoint has been reached is checked for in step 436.

If it is ascertained in step 414 that a non-determining event has occurred, event handler 122 is run to handle the non-determining event in a step 434. Recovery counter 100 is re-enabled via enabling/disabling bit 106 in step 430. Whether a checkpoint has been reached is checked for in step 436.

In an alternative preferred embodiment, when an asynchronous event occurs, recovery counter 100 is re-enabled after recovery counter value 102 and information sufficient to distinguish the asynchronous event are logged. Re-enabling recovery counter 100 before completely handling the asynchronous event enables a second asynchronous event with a high priority to interrupt handling of a first asynchronous event with a lower priority.

Figure 5:
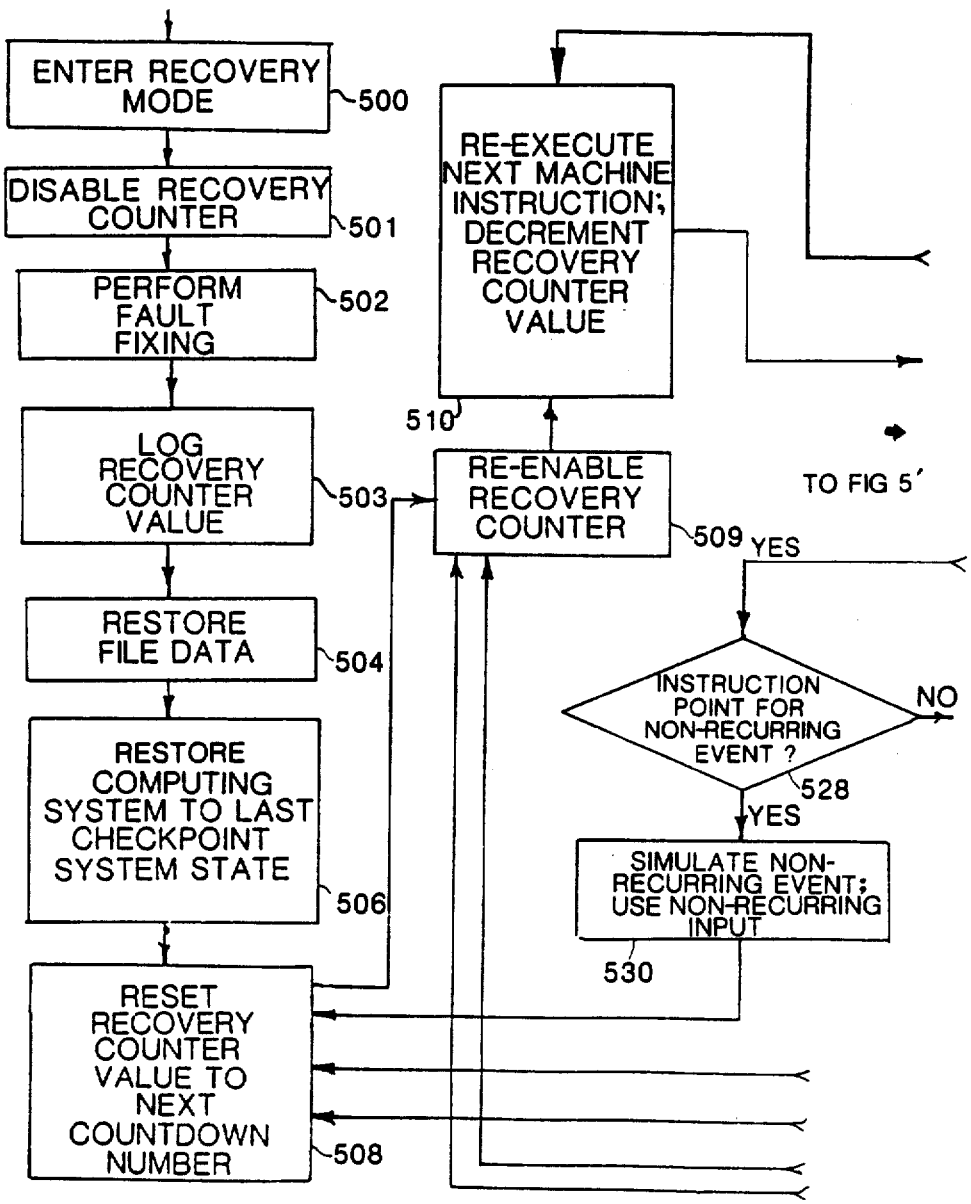
FIG. 5, comprised of FIGS. 5 and 5', is a flow-chart depicting steps taken following fault detection to achieve fault recovery.

FIG. 5 depicts recovery steps taken by computing system 101 upon detection of a fault. Recovery mode is entered in a step 500. Recovery counter 100 is temporarily disabled via enabling/disabling bit 106 in a step 501. Fault fixing is performed by running fault fixer 124 in a step 502. Recovery counter value 102, existing at fault detection, is read via bus 110 and logged in a step 503. In a step 504, file data 107 is reset by running checkpoint system state resetter 118, which uses a previously recorded event log on disk 116. In a step 506, checkpoint system state resetter 118 is run to restore computing system 101 to a last checkpoint system state by resetting process control blocks 103 and local data 105.

Recovery counter value 102 is reset via bus 110 in a step 508. Recovery counter value 102 is reset to a count of machine instructions which must be executed to reach an instruction point identical to an instruction point at which a specified determining event or fault occurred. The count of machine instructions is called a countdown number; a countdown number is determined from previously logged recovery counter values.

In a step 509, recovery counter 100 is re-enabled via enabling/disabling bit 106. A machine instruction is re-executed by processor 104, and recovery counter value 102 is decremented with each machine instruction re-executed, in a step 510. Machine instructions are re-executed which are identical to machine instructions originally executed. Machine instructions are re-executed in step 510 until a trap or an asynchronous event occurs.

If a trap or an asynchronous occurs in a step 512, recovery counter counter 100 is temporarily disabled via enabling/disabling bit 106 in a step 514. Recovery counter value 102 is checked in a step 516. If recovery counter value 102 has not counted down through zero, then an asynchronous event has occurred. If recovery counter value 102 has counted down through zero, then a trap has been generated by high bit 112.

If it is ascertained in a step 518 that an early recurring event has occurred, event logger 123 is run to log a recurrence of the early recurring event in a step 520. Event logger 123 distinguishes the recurrence of the early recurring event, in case the early recurring event has recurred out of order with another recurring event. Event handler 122 does not immediately handle the early recurring event; the early recurring event is handled later in a step 536. Step 509 is returned to; recovery counter 100 is re-enabled.

If it is ascertained in step 518 that a non-determining event has occurred, event handler 122 is run to handle the non-determining event in a step 526. Recovery counter 100 is re-enabled in step 509.

If it is ascertained in a step 528 that an instruction point for a non-recurring event has been reached, trap handler 114 calls event simulator 120 to simulate the non-recurring event in a step 530. If a non-recurring input was received during an original handling of the non-recurring event, the non-recurring input is used by event simulator 120. Recovery counter value 102 is reset to a next countdown number in step 508.

If it is ascertained in a step 534 that an instruction point for an early recurring event has been reached, trap handler 114 calls event handler 122 to re-handle the early recurring event in a step 536. Recovery counter value 102 is reset to a next countdown number in step 508.

If it is ascertained in a step 538 that an instruction point for a late recurring event has been reached, trap handler 114 waits in a step 540 for the late recurring event to recur. Trap handler 114 calls event handler 112 to re-handle the late recurring event in a step 542. Recovery counter value 102 is reset to a next countdown number in step 508.

If a trap has been generated, but an instruction point for a non-recurring event, an early recurring event, or a late recurring event has not been reached, then an instruction point for fault occurrence has been reached. In a step 544, recovery counter value 102 is reset via bus 110 to a previously logged value existing at fault occurrence. Recovery counter 100 is re-enabled via enabling-/disabling bit 106 in a step 545. Recovery mode is exited in a step 546.

Figure 6:
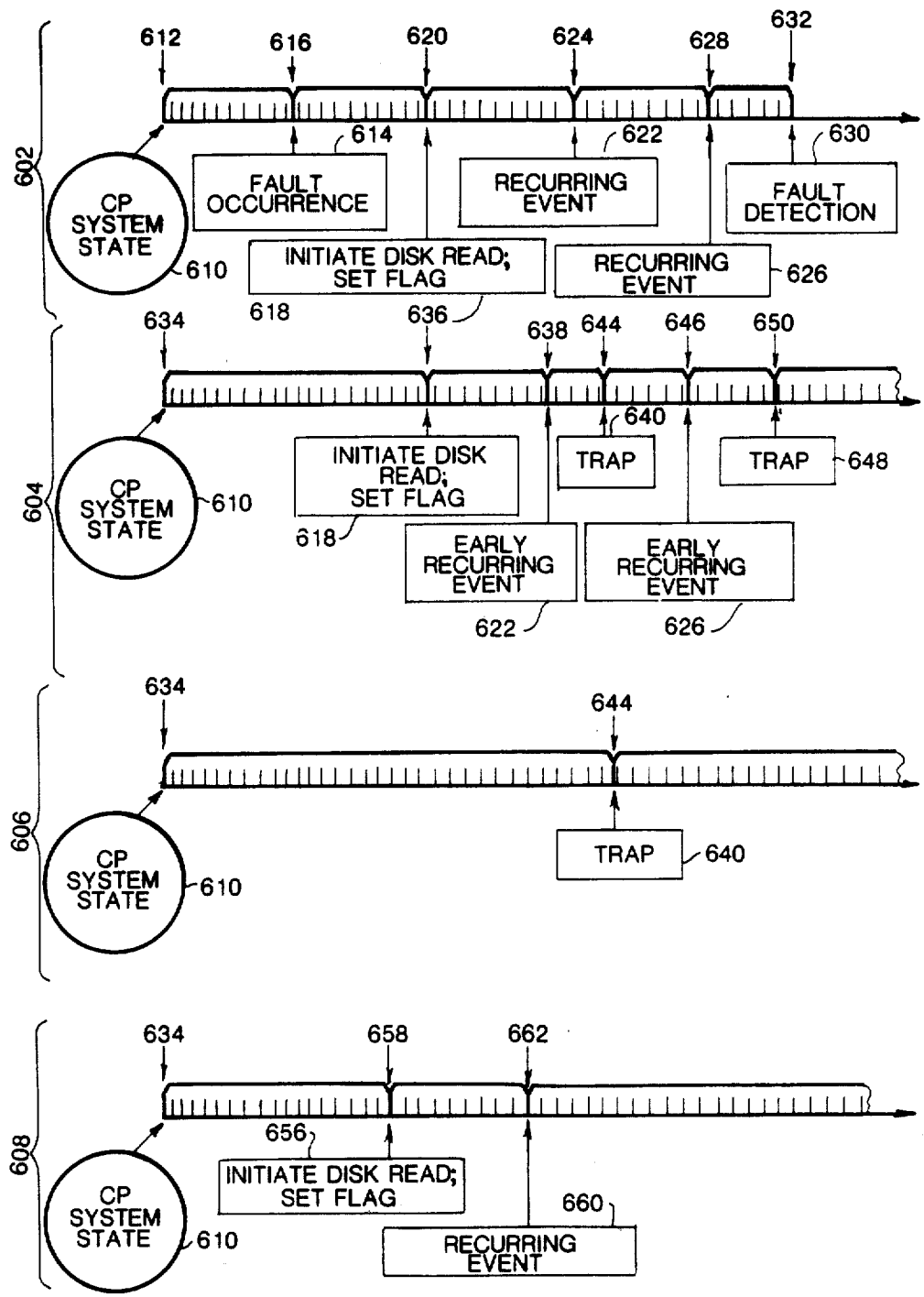
FIG. 6 depicts typical execution sequences and re-execution sequences of machine instructions.

In an alternative preferred embodiment, a precise instruction point at which a fault occurs need not be identified by computing system 101, provided fault detection is timely. FIG. 6 depicts a series of machine instructions executed for a typical execution sequence 602, and for typical re-execution sequences 602, 604, and 606.

In execution sequence 602, a checkpoint system state 610 exists at an instruction point 612. A fault occurrence 614 takes place at an instruction point 616. Processor 104 initiates a disk read request 618 at an instruction point 620. Occurring simultaneously with disk read request 618, a flag is set to record disk read request 618. A recurring event 622, which is an input event in response to disk read request 618, takes place at an instruction point 624. A recurring event 626 takes place at an instruction point 628. A fault detection 630 takes place at an instruction point 632. From a viewpoint of computing system 101, fault occurrence 614 cannot be located precisely, but can only be determined to have taken place somewhere between instruction points 612 and 632.

Re-execution sequence 604 is a typical example of what happens if fault occurrence 614 did not propagate and cause disk read request 618 to be initiated. Disk read request 618, along with a flag setting, takes place at an instruction point 636. Instruction point 636 in re-execution sequence 604 is identical to instruction point 620 in execution sequence 602. Recurring event 622 recurs early at an instruction point 638. Recurring event 622 is not dealt with until a trap 640 takes place at an instruction point 644. Instruction point 644 in re-execution sequence 604 is identical to instruction point 624 in execution sequence 602. Recurring event 626 recurs early at an instruction point 646. Recurring event 626 is not dealt with until a trap 648 takes place at an instruction point 650. Instruction point 650 in re-execution sequence 604 is identical to instruction point 628 in execution sequence 602. After recurring event 626 is re-handled, no more previously logged determining event information is left, so normal execution continues.

Re-execution sequence 606 is a typical example of what happens if fault occurrence 614 did propagate and caused disk read request 618 to be initiated erroneously. During re-execution sequence 606, fault occurrence 614 is not repeated. This causes disk read request 618 to not take place, and no flag is set. Trap 640 takes place at instruction point 644. Previously logged determining event information indicates that recurring event 622 should be re-handled at instruction point 644. Since no flag indicating a disk read has been set, however, it can be determined that recurring event 622 erroneously took place in execution sequence 602. It can be determined that re-execution has proceeded past an instruction point identical to the instruction point in execution sequence 602 at which fault occurrence originally took place. Previously logged information for recurring events 622 and 626 is discarded, and normal execution continues.

Re-execution sequence 608 is another example of what happens if fault occurrence 614 did propagate and cause disk read request 618 to be initiated erroneously. During re-execution sequence 608, fault occurrence 614 is not repeated. This causes disk read request 618 to not take place, and no flag is set. A disk read request 656 is initiated at an instruction point 658. Occurring simultaneously with disk read request 656, a flag is set to record disk read request 656. Disk read request 656 causes a recurring event 660 to occur at an instruction point 662. When event handler 123 is unable to match up recurring event 660 with previously logged information for recurring events 622 and 626, it can be determined that re-execution has proceeded past an instruction point identical to the instruction point in execution sequence 602 at which fault occurrence originally took place. Previously logged information for recurring events 622 and 626 is discarded, and normal execution continues.

Prior to fault detection 630, fault occurrence 614 may have propagated an error which had effects which are too serious to be dealt with by computing system 101. If previously logged information indicates that such an error was propagated, processor 104 halts execution, and human intervention is requested.

We claim:

1. A method of preparing for recovery from a fault detected within a computing system, said method comprising the steps of:
    recording a checkpoint system state of the computing system at a first checkpoint;
    counting machine instructions executed after recording the checkpoint system state; and,
    logging determining event information for a handling of a determining event.

2. A method as in claim 1, further comprising the step of:
    logging non-recurring inputs.

3. A method as in claim 2, wherein the determining event information includes a count of a number of machine instructions executed between an identified instruction point and the occurrence of a determining event.

4. A method as in claim 3, wherein an interval between the first checkpoint and a second checkpoint is made programmable, enabling a trade-off to be made between computing system performance and mean time required to perform a fault recovery.

5. A method of recovering from a fault occurrence within a computing system, said method comprising the steps of:
    restoring a system state of the computing system to a previously recorded last checkpoint system state;
    re-executing machine instructions, originally executed in an execution sequence, in a re-execution sequence, wherein the re-execution sequence is substantially similar to the execution sequence; and,
    repeating determining events, originally handled in an order in the execution sequence, in an identical order in the re-execution sequence.

6. A method as in claim 5, wherein determining events are repeated by re-handling recurring events and simulating non-recurring events.

7. A method as in claim 6, wherein machine instructions are re-executed in an order identical to an order in which machine instructions were originally executed.

8. A method as in claim 7, further comprising the step of:
    repeating each determining event which was handled after recording the checkpoint system state and before the fault occurrence.

9. A method as in claim 8, further comprising the step of:
    repeating each determining event at an instruction point in the re-execution sequence identical to an instruction point in the execution sequence at which each determining event originally was handled.

10. A method as in claim 9, wherein the step of repeating each determining event at an instruction point in the re-execution sequence identical to an instruction point in the execution sequence at which each determining event originally was handled is accomplished by counting machine instructions re-executed and using a previously logged count of machine instructions.

11. A method as in claim 10, further comprising the step of:
    abandoning the re-execution sequence if an instruction point, identical to an instruction point at which the fault occurrence took place, has been reached.

12. A method as in claim 10, further comprising the step of:
    abandoning the re-execution sequence if an instruction point, identical to an instruction point at which the fault occurrence was detected, has been reached.

13. A method as in claim 10, further comprising the step of:
    abandoning the re-execution sequence if an instruction point has been reached at which determining event information indicates that a determining event should be repeated, but no such determining event has been initiated in the re-execution sequence.

14. A method as in claim 10, further comprising the step of:
    abandoning the re-execution sequence if an instruction point has been reached at which a determining event has been initiated and should be handled, but no corresponding determining event information has been logged in the execution sequence.

15. A method as in claim 10, wherein the step of repeating each determining event at an instruction point in the re-execution sequence identical to an instruction point in the execution sequence at which each determining event originally was handled is accomplished by distinguishing but not immediately handling an early recurrence of an early recurring event.

16. A method as in claim 10, wherein the step of repeating each determining event at an instruction point in the re-execution sequence identical to an instruction point in the execution sequence at which each determining event originally was handled is accomplished by waiting for a recurrence of a late recurring event.

17. A method as in claim 10, wherein the step of repeating each determining event at an instruction point in the re-execution sequence identical to an instruction point in the execution sequence at which each determining event originally was handled is accomplished by using a previously logged non-recurring input to simulate a non-recurring event whose original handling involved an inputting of the non-recurring input.

18. A method as in claim 10, wherein the step of repeating each determining event at an instruction point in the re-execution sequence identical to an instruction point in the execution sequence at which each determining event originally was handled is accomplished by generating a trap at each instruction point in the re-execution sequence identical to an instruction point in the execution sequence at which each determining event originally was handled.

19. A method as in claim 10, further comprising the step of:
    bypassing re-execution of a non-determining event.

20. A method as in claim 19, wherein the step of bypassing re-execution of a non-determining event is accomplished by not counting machine instructions executed as part of an original occurrence of the non-determining event.

21. A method of preparing for and recovering from a fault detected within a computing system, said method comprising the steps of:
    counting machine instructions executed after recording a last checkpoint system state;

logging determining event information for a handling of a determining event;

restoring a system state of the computing system to a previously recorded last checkpoint system state;

re-executing machine instructions, originally executed in an execution sequence, in a re-execution sequence, wherein the re-execution sequence is substantially similar to the execution sequence; and, repeating determining events, originally handled in an order in the execution sequence, in an identical order in the re-execution sequence.

22. An apparatus useful for recovering from faults within a computing system, said apparatus comprising:

counting means for counting machine instructions executed;

reading means for reading a value of the counting means; and, logging means for logging determining event information.

23. An apparatus as in claim 22, further comprising:

handling means for handling an occurrence and rehandling a recurrence of a determining event;

simulating means for simulating a recurrence of a non-recurring event;

recording means for recording information necessary to restore the computing system to a checkpoint system state; and, restoring means for restoring the computing system to a previously recorded checkpoint system state.

24. An apparatus as in claim 23, further comprising:

trap generation means for generating a trap when the counting means has counted a first number of machine instructions; and, trap handling means for handling a trap generated when the counting means has counted the first number of machine instructions.

25. An apparatus as in claim 24, further comprising:

enabling means for enabling the counting means; and, disabling means for disabling the counting means.

26. An apparatus as in claim 25, further comprising:

writing means for writing a new value into the counting means.

27. An apparatus for recovering from faults within a computing system comprising:

means for counting executed machine instruction; and means for recording determining event information during an execution of a sequence of machine instructions, the recording means including means for recording a value of the counting means.

28. The apparatus as in claim 27 further comprising means for selectively enabling and disabling the counting means.

29. The apparatus as in claim 27 further comprising means for setting the counting means to a prescribed value.

30. The apparatus as in claim 27 further comprising means for generating a trap when the counting means contains a prescribed value.

31. The apparatus as in claim 30 further comprising means for processing the trap.

32. The apparatus as in claim 27 wherein the recording means includes means for recording information necessary for restoring the computing system to a prescribed state and further comprising:

means for restoring the computing system to the prescribed state.

33. The apparatus as in claim 32 further comprising means for generating a trap when the counting means contains a prescribed value.

34. The apparatus as in claim 33 further comprising means, responsive to the trap generating means, for processing a recurrence of a determining event during a re-execution of the sequence of machine instructions.

35. The apparatus as in claim 34 further comprising means, responsive to the trap generating means, for simulating a recurrence of a non-recurring event during a re-execution of the sequence of machine instructions.

* * * * *